UNITED STATES PATENT OFFICE.

HERBERT AMOS HOBSON, OF LONDON, ENGLAND, ASSIGNOR TO THE CONCENTRATED BEER COMPANY, LIMITED, OF LONDON, ENGLAND.

CONCENTRATED HOPPED WORT AND PROCESS OF PRODUCING SAME.

SPECIFICATION forming part of Letters Patent No. 718,253, dated January 13, 1903.

Application filed July 27, 1900. Serial No. 25,015. (No specimens.)

*To all whom it may concern:*

Be it known that I, HERBERT AMOS HOBSON, analytical chemist, a subject of the Queen of Great Britain, residing at 54 Church road, Acton, London, England, have invented new and useful Improvements in a Concentrated Hopped Wort and Process of Producing the Same, of which the following is a specification.

This invention relates to the production of a hopped wort from which beer, either alcoholic or non-alcoholic, may be produced by the mere addition of yeast and water or of water alone, as the case may be.

In the ordinary brewing process the malt is first mashed and the hops are then added to and boiled in the wort or extract of malt, with the result that the bitter of the hop is unfavorably affected, objectionable resinous matters are extracted, and the volatile aroma of the hops is to a great extent lost, and these undesirable results are partly due to the length of time for which the boiling is continued and partly to the high boiling-point of the liquor in which the hops are boiled. It is the object of this invention to avoid these defects and to produce a hopped wort, preferably in a concentrated state, possessing the keeping qualities necessary for export purposes and adapted for the production, in the locality or country of consumption, of beer possessing the characteristic qualities of beer brewed in the ordinary manner.

In carrying out this invention it is preferred to first treat the hops mechanically in order to separate therefrom the "lupulin"—*i. e.*, the yellow powder commonly called "flour" or "condition"—which is collected for the purpose of being subsequently added to the concentrated hopped wort. It is this lupulin which gives to beer the real distinctive aroma and flavor of the hop, (other than the bitter,) and by its preliminary abstraction and subsequent addition not only is loss of aroma and flavor avoided, but the expense of "dry-hopping"—that is to say, the addition of dry hops of the best quality to the finished beer—is avoided. This lupulin is, however, so adherent to new hops as to be hardly separable therefrom by the mechanical means; but the separation is easily effected in the case of old hops. New hops—that is to say, hops less than six months old—should in any case be dried by a warm air-current or in a stove until as crisp as hops from six to eight months old. In practice a mixture of old and dried new hops—say about two parts of old to one part of new—is used, from which about half the total amount of lupulin present—that is to say, equal to about three to five per cent. of the weight of the hops—would be separated. This operation may be effected, for instance, by passing the hops through a mill formed of a drum-sieve provided with internal beater-arms carried by the drum-shaft and revolving within the drum, so as to break up the hop-flowers and set free the lupulin, which passes through the canvas or gauze. Whether the lupulin be so first separated or not the hops are boiled or digested in plain water for a period sufficient to extract the remaining useful properties of the hops. The quantity of water used for this purpose should be as small as possible consistently with the extraction of the desired constituents. It is preferred to commence the operation with two pounds of hops to ten gallons of water—*i. e.*, two per cent., by weight—so that at the conclusion of the boiling or digestion the loss of water by evaporation will bring the proportion up to from two and one-half per cent. to three per cent. of hops.

If a non-alcoholic beer is to be made, the mixture of hops and water is slowly heated to a temperature below boiling—say 200° Fahrenheit—and would be digested at that temperature for from two to three hours. If an alcoholic beer is to be brewed, the mixture of hops and water would be slowly heated to boiling and be gently boiled for from about one and one-half to two and one-half hours. In either case the infusion of hops thus obtained contains tannic acid and other substances which would retard or prevent the action of the malt diastase, upon which the formation of the malt extract depends, and it could not consequently be used in this state without serious loss of extract, particularly for mashing a mixture of malt and grain. To overcome this difficulty, the infusion after being run off from the hops is digested for a few minutes with about five per cent. to ten per cent. of spent malt (or it might be about the same proportion of fresh malt specially mashed for the purpose) or some other substance containing the necessary albuminous matter, such as crushed wheat or crushed barley mashed in warm water or an equivalent quantity of "finings" or other gelatinous matter, whereupon the tannic acid combines with the albuminous matter of the spent malt or other substance and is thus rendered entirely harmless. The hop extract or liquor is then run off into the mash-tun (after, if necessary, straining the liquor from the precipitate or residue) and the ground or crushed malt (or malt and grain) is then added and mashed in the hop liquor for the usual time or until the soluble constituents and the constituents of the malt or malt and grain which have been rendered soluble under the influence of the diastase of the malt have been extracted by and dissolved in the liquor or until the necessary proportions of malt, sugar, and dextrine have been obtained. The quantity of malt or of malt and grain (mixed in the proportions ordinarily used by brewers) so added to and mashed in the hop liquor should be from twenty per cent. to thirty per cent., by weight, of the liquor, equal to from twenty pounds to thirty pounds per ten gallons. It is then only necessary to bring the hopped malt-wort—i. e., liquor and malt—up to a temperature of from 205° to 212° Fahrenheit and keep it at that temperature, say, for half an hour. If raw grain has been used with the malt, the liquor is then let stand for about half an hour and preferably stirred frequently. In either case the liquor is then strained off as clear as possible, and the hopped wort thus obtained is then concentrated (preferably *in vacuo*) to the required strength. The extent to which the concentration may be carried may be varied according to requirement, the limitation being the formation of a treacly or semifluid liquor when hot, which forms a stiff paste when cold. Usually the concentration would be to from one-tenth to one-fifteenth of the volume of liquor placed in the concentrator. The flour or condition of the hop, (lupulin,) previously mentioned as having been abstracted at the commencement of the operation, is added and thoroughly stirred into the hopped wort just before the latter arrives at its final degree of concentration. The concentrated hopped wort is then put up in kegs or drums for transport or export and will remain in good condition for an indefinite period. To produce a beverage therefrom, the necessary quantity of concentrated hopped wort is dissolved in warm water and the solution put into a cask or vat, which is then filled up with cold water sufficient in quantity to give the required specific gravity and temperature, which are easily attained by using measured quantities. Yeast is added if an alcoholic beer is to be produced, the resulting primary fermentation by which alcohol and carbonic-acid gas are formed being complete in about one or two weeks, according to temperature, and if the beer is then allowed to stand for a few days longer it becomes clear and continues to improve by keeping.

By this invention a great saving in freightage on export to distant countries may be effected and a finished beer may be readily produced in countries where owing to climatic or other conditions the ordinary processes of brewing would be impracticable.

Having thus described my invention, I claim as new and desire to secure by Letters Patent—

1. The herein-described process of producing a hopped wort, which consists in first abstracting lupulin from hops then heating the remaining hops in water thus forming an extract or infusion containing tannic acid, then separating the infusion from the hops and digesting it with a substance containing albuminous matter, causing said matter to combine with the tannic acid, thereupon separating the liquor and mashing malt (or malt and grain) therein, and finally adding to the liquor, the lupulin abstracted at the outset.

2. The herein-described process of producing a hopped wort, which consists in first abstracting lupulin from hops, then heating the remaining hops in water thus forming an extract or infusion containing tannic acid, then separating the infusion from the hops and digesting it with a substance containing albuminous matter, causing said matter to combine with the tannic acid, and finally separating the liquor and mashing malt (or malt and grain) therein.

3. The herein-described process of producing a hopped wort, which consists in first abstracting lupulin from hops, then heating the remaining hops in water thus forming an extract or infusion containing tannic acid, then separating the infusion from the hops and digesting it with a substance containing albuminous matter, causing said matter to combine with the tannic acid, thereupon separating the liquor and mashing malt (or malt and grain) therein, and finally adding lupulin to the liquor.

4. The herein-described process of producing a hopped wort, which consists in first abstracting lupulin from hops, then heating the remaining hops in water thus forming an abstract or infusion containing tannic acid, then separating the infusion from the hops and digesting it with a substance containing albuminous matter, causing said matter to combine with the tannic acid, thereupon separating the liquor and mashing malt (or malt and grain) therein, then concentrating the liquor, and finally adding lupulin thereto.

5. The herein-described process of producing a hopped wort, which consists in first heating hops in water, thus forming an extract or infusion containing tannic acid, then separating the infusion from the hops and digesting it with a substance containing albuminous matter, causing said matter to combine with the tannic acid, and finally separating the liquor and mashing malt (or malt and grain) therein.

6. A concentrated hopped wort practically free from compounds of tannic acid with albuminoid matters.

7. A concentrated hopped wort practically free from compounds of tannic acid with albuminoid matters, and containing hop-lupulin unchanged as regards its characteristic aroma and preservative properties.

8. A concentrated hopped wort free from hop-flowers, and containing hop-lupulin unaffected by boiling and therefore unchanged as regards its characteristic aroma and preservative properties.

9. A concentrated hopped wort free from hop-flowers and containing raw, unboiled, powdered hop-lupulin suspended in the wort, and therefore unchanged as regards its characteristic aroma and preservative properties.

10. The process of manufacturing a hopped wort, which consists, first, in digesting hops in hot water to produce an infusion of hops; second, in straining off said infusion from the hops; third, in mashing malt (or malt and grain) in said infusion of hops itself as the mashing liquor, and, fourth, in straining off the wort from the insoluble residue.

11. The process of manufacturing a hopped wort, which consists, first, in digesting fresh or new hops in hot water to produce an infusion of hops; second, in straining off said infusion from the hops; third, in mashing malt (or malt and grain) in said infusion of hops itself as the mashing liquor, and, fourth, in straining off the wort from the insoluble residue.

12. The process of manufacturing a hopped wort, which consists, first, in digesting hops in hot water to produce an infusion of hops; second, in straining off said infusion from the hops; third, in adding an albuminous substance to the hop infusion for the purpose specified; fourth, in mashing malt (or malt and grain) in said infusion of hops, and, fifth, in straining off the wort from the insoluble residue.

13. The process of manufacturing a hopped wort, which consists, first, in digesting hops in hot water to produce an infusion of hops; second, in straining off said infusion from the hops; third, in adding an albuminous substance to the hop infusion, for the purpose specified, and separating the resulting precipitate from the hop infusion; fourth, in mashing malt (or malt and grain) in said infusion of hops, and, fifth, in straining off the wort from the insoluble residue.

HERBERT AMOS HOBSON.

Witnesses:
T. W. KENNARD,
M. R. SPIER.